United States Patent [19]

Wisotzki et al.

[11] Patent Number: 4,976,885

[45] Date of Patent: Dec. 11, 1990

[54] LIQUID PREPARATIONS FOR CLEANING HARD SURFACES

[75] Inventors: Klaus-Dieter Wisotzki; Klaus Schumann, both of Erkrath; Konard Engelskirchen, Meerbusch; Brigitte Hase, Erkrath, all of Fed. Rep. of Germany

[73] Assignee: Henkel Kommanditgesellschaft auf Aktien, Duesseldorf-Holthausen, Fed. Rep. of Germany

[21] Appl. No.: 231,799

[22] Filed: Aug. 12, 1988

[30] Foreign Application Priority Data

Aug. 13, 1987 [DE] Fed. Rep. of Germany ....... 3726912

[51] Int. Cl.[5] .................................... C03L 1/00

[52] U.S. Cl. .................................... 252/174.17; 536/90; 536/98; 106/169; 106/170

[58] Field of Search .................................... 252/174.17; 536/90, 536/98; 106/169, 170

[56] References Cited

U.S. PATENT DOCUMENTS

| | | | |
|---|---|---|---|
| 3,472,840 | 10/1969 | Stone et al. | 260/231 |
| 3,676,423 | 7/1972 | Elizer | 536/43 |
| 4,082,684 | 4/1978 | Kriescher | 252/109 |
| 4,101,456 | 7/1978 | Renaud et al. | 252/551 |
| 4,175,062 | 11/1979 | Disch et al. | 252/540 |
| 4,343,725 | 8/1982 | Kiewert et al. | 252/542 |
| 4,383,062 | 5/1983 | Saad | 524/35 |
| 4,576,744 | 3/1986 | Edwards et al. | 252/554 |

FOREIGN PATENT DOCUMENTS

| | | |
|---|---|---|
| 0009193 | 10/1981 | European Pat. Off. . |
| 0036625 | 3/1984 | European Pat. Off. . |
| 0066342 | 12/1986 | European Pat. Off. . |
| 2616404 | 10/1980 | Fed. Rep. of Germany . |
| 2913049 | 10/1980 | Fed. Rep. of Germany . |
| 2840463 | 12/1983 | Fed. Rep. of Germany . |
| 3512535 | 4/1985 | Fed. Rep. of Germany . |
| 2104091 | 3/1983 | United Kingdom . |

*Primary Examiner*—John F. Niebling
*Assistant Examiner*—Isabelle R. McAndrews
*Attorney, Agent, or Firm*—Ernest G. Szoke; Wayne C. Jaeschke; Real J. Grandmaison

[57] ABSTRACT

Liquid preparations for cleaning hard surfaces based on anionic surfactants either individually or in combination with nonionic surfactants or amphoteric surfactants, or nonionic surfactants either individually or in combination with cationic surfactants, solubilizers and, optionally, builders, dyes, perfumes and preservatives, containing an addition of polymers, namely cellulose ethers.

12 Claims, No Drawings

LIQUID PREPARATIONS FOR CLEANING HARD SURFACES

BACKGROUND OF THE INVENTION

1. Field of the Invention:

Conventional liquid manual dishwashing detergent compositions generally designed for use at slightly elevated temperatures essentially contain as their active constituents mixtures of synthetic anionic surfactants in quantities of from about 4 to about 60% by weight and, optionally, small quantities of nonionic surfactants, preferably alkanolamides, or amphoteric surfactants, such as betaines, for example as foam stabilizers, and also solvents, solubilizers, hydrotropic substances, perfumes and dyes, preservatives, viscosity regulators, pH regulators and electrolytes. For skin-care reasons, the pH value is in the range from about 5.5 to 8.0. In some cases, although not typically, the preparations may also contain small quantities of builders or complexing agents, such as hexametaphosphate or ethylenediaminetetraacetate, for use in areas where the water is of high mineral content. Preparations such as these are known, for example, from European Patent No. 36 625.

Conventional multipurpose cleaning preparations, i.e. preparations for cleaning various hard surfaces both in the home and in the institutional sector, preferably contain as their active components combinations of anionic and nonionic surfactants in a total quantity of from about 5 to about 15% by weight and also performance-enhancing builders in quantities of from about 0.1 to 5% by weight and, as organic polymers for improving the cleaning effect, polyethylene glycols corresponding to the general formula $HO-(CH_2-CH_2-O)_n-H$, where n may vary from 4,800 to 64,600. Preparations such as these are also blended with dyes and perfumes, electrolytes and viscosity regulators. Their pH value is preferably in the range from 8.5 to 11 because the cleaning power which, with these preparations, generally has to be developed at room temperature is generally better in alkaline medium than in neutral or acidic medium. Multipurpose cleaning preparations of the type herein are known, from U.S. Pat. No. 4,175,062 and from European Patent No. 9 193.

2. Discussion of Related Art:

Cleaning preparations containing an addition of corresponding performance-enhancing polymers are also described in German patent applications Nos. 29 13 049 and 35 12 535, of which the latter relates to multipurpose cleaning preparations, and wherein water-soluble polyethylene glycols having a molecular weight of from $3\times10^5$ to $4\times10^6$ and preferably from $5\times10^5$ to $1\times10^6$ have proved to be particularly suitable. The use of polymers such as these in cleaning preparations for hard surfaces is described in German Patent No. 28 40 463 (EP No. 9 193) and in U.S. Pat. No. 4,343,725.

According to the teaching of U.S. Pat. No. 4,082,684 and European patent application No. 66 342, copolymers of monovinyl monomers, for example of styrene or vinyl methyl ether, with unsaturated dicarboxylic acids or anhydrides thereof, for example maleic acid, are used in multipurpose cleaning preparations. These polymers are said primarily to suppress the formation of streaks on hard surfaces.

In British patent application No. 2,104,091, ampholytic copolymers of anionic and cationic vinyl monomers are recommended for enhancing performance in surfactant formulations.

U.S. Pat. No. 4,576,744 describes the use of water-soluble polymers, for example polysaccharides or xanthan gum, which are said both to increase the viscosity of the surfactants formulation and also to improve its cleaning power and foam behavior.

According to U.S. Pat. No. 4,104,456, which also relates to multipurpose cleaning preparations and comes closest to the present invention, additions of polymers, namely water-soluble cationic cellulose ethers having a molecular weight of 25,000 to 10,000,000, are recommended for improving the drainage of liquids on hard surfaces.

DESCRIPTION OF THE INVENTION

Other than in the operating examples, or where otherwise indicated, all numbers expressing quantities of ingredients or reaction conditions used herein are to be understood as modified in all instances by the term "about".

It has now surprisingly been found that the performance of liquid preparations for cleaning various hard surfaces based on anionic surfactants either individually or in combination with nonionic surfactants or amphoteric surfactants (betaines) or on nonionic surfactants either individually or in combination with cationic surfactants, solubilizers and polymers and, optionally, builders, dyes, perfumes and preservatives can be considerably improved by the addition thereto of ampholytic cellulose ethers instead of the cationic cellulose ethers according to German patent application No. 26 16 404.

The ampholytic cellulose ethers are prepared in known manner by mixed etherification of (alkali) cellulose with sodium monochloroacetate and 2-chloroethyl diethylamine with variation of the quantities of carboxymethylating agent or aminating agent. The degree of substitution of the cellulose is between 0.4 and 2 and preferably between 0.6 and 1.2. The Brookfield viscosity of a 2% by weight aqueous solution of the polymers should be between 3.000 and 120,000 mPa.s, and preferably between 9,000 and 80,000 mPa.s.

The liquid preparations according to the invention for cleaning hard surfaces are particularly characterized in that they contain 1 to 40% by weight and preferably 5 to 25% by weight of anionic surfactants, 0 to 20% by weight and preferably 0.5 to 15% by weight of nonionic surfactants or amphoteric surfactants, 0 to 10% and preferably 0.5 to 5% by weight builders, 1 to 15% by weight and preferably 0.5 to 12% by weight of solubilizers, 0.01 to 1.5% by weight and preferably 0.03 to 1% by weight of the polymers according to the invention, and, optionally, other standard auxiliaries, particularly dyes and perfumes, preservatives, pH regulators and to make up the balance to 100% by weight, water.

Formulations free from anionic surfactants may contain 0 to 5% by weight and preferably 0.1 to 3% by weight of cationic surfactants, even in admixture with nonionic surfactants. The same formulation data as above otherwise apply.

Suitable synthetic anionic surfactants include those of the sulfonate type, the sulfate type and the synthetic carboxylate type.

Suitable surfactants of the sulfonate type include $C_9$-$C_{15}$ alkylbenzenesulfonates, mixtures of alkene- and hydroxyalkanesulfonates and also disulfonates of the type obtained, for example, from monoolefins containing a terminal or internal double bond by sulfonation with gaseous sulfur trioxide and subsequent alkaline or acidic hydrolysis of the sulfonation group. Other suitable surfactants of the sulfonate type include alkanesulfonates of the type obtainable from alkanes by sulfochlorination or sulfoxidation and subsequent hydrolysis or neutralization or by bisulfite addition onto olefins. Other useful surfactants of the sulfonate type include these esters of α-sulfofatty acids, for example the α-sulfonic acids of hydrogenated methyl or ethyl esters of coconut oil, palm kernel oil or tallow fatty acid.

Suitable surfactants of the sulfate type include the sulfuric acid monoesters of primary alcohols, for example of coconut oil fatty alcohols, tallow fatty alcohols or oleyl alcohol, and those of secondary alcohols. Other suitable surfactants of the sulfate type include sulfatized fatty acid alkanolamides, fatty acid monoglycerides or reaction products of 1 to 4 mol of ethylene oxide with primary or secondary fatty alcohols or alkylphenols.

Other suitable anionic surfactants include the fatty acid esters or amides of hydroxycarboxylic or aminocarboxylic or sulfonic acid, such as for example fatty acid sarcosides, glycolates, lactates, taurides or isethionates, α-sulfosuccinic acid esters and fatty acid cyanamides.

The hydrophobic radicals of the surfactants generally contain between 6 and 18 and preferably between 8 to 18 carbon atoms.

The anionic surfactants may be present in the form of their alkali metal, alkaline-earth and ammonium salts and as soluble salts of organic bases, for example of mono-,di- or triethanolamine. The sodium salts are generally preferred for reasons of cost.

Suitable nonionic surfactants include adducts of 4 to 40 mol, and preferably 4 to 20 mol, of ethylene oxide or ethylene oxide and propylene oxide with 1 mol of fatty alcohol, alkanediol, alkylphenol, fatty acid, fatty amine, fatty acid amide or alkanesulfonamide. Of particular importance are the adducts of 5 to 16 mol of ethylene oxide or ethylene oxide and propylene oxide with coconut oil or tallow fatty alcohols, with oleyl alcohol or with secondary alcohols containing 8 to 18, and preferably 12 to 18, carbon atoms and with mono- or dialkylphenols containing 6 to 14 carbon atoms in the alkyl radicals. In addition to these water-soluble nonionics, however, water-insoluble or substantially water-insoluble polyglycolethers containing 1 to 4 ethylene glycolether groups in the molecule are also of interest, particularly where they are used together with water-soluble nonionic or anionic surfactants.

Other suitable nonionic surfactants include the water-soluble adducts, containing 20 to 250 ethylene glycolether groups and 10 to 100 propylene glycolether groups, of ethylene oxide with polypropylene oxide, alkylenediamine polypropylene glycol and alkylpolypropylene glycols containing 1 to 10 carbon atoms in the alkyl chain in which the polypropylene glycol chain functions as the hydrophobic component.

Nonionic surfactants of the amine oxide type are also suitable. Typical representatives include, for example, the compounds N-dodecyl-N,N-dimethylamine oxide, N-tetradecyl-N,N-dihydroxyethylamine oxide, and N-hexadecyl,N,N-bis-(2,3-di-hydroxypropyl)-amine oxide.

Alkyl glucosides containing 12 to 18, and preferably 12 to 14, carbon atoms in the linear or branched alkyl radical and also 1 to 4, and preferably 1 to 2, glucose units in the molecule are also suitable.

Suitable amphoteric surfactants include those which contain both acidic groups, such as for example carboxyl, sulfonic acid, sulfuric acid semiester, phosphonic acid and phosphoric acid partial ester groups, and also basic groups, such as for example primary, secondary, tertiary and quaternary ammonium groups, in the molecule. Amphoteric compounds containing quaternary ammonium groups belong to the group of betaines or zwitterionic surfactants. The compounds herein are, in particular, derivatives of aliphatic quaternary ammonium compounds, in which one of the aliphatic radicals consists of a $C_8$-$C_{18}$ alkyl radical while another contains an anionic, water-solubilizing carboxy, sulfo or sulfate group. Typical representatives of such surface-active betaines include, for example, the compounds 3-(N-hexadecyl-N,N-dimethylammonio)propanesulfonate, 3-(N-tallowalkyl-N,N-dimethylammonio)-2-hydroxypropansulfonate, 3-(N-hexadecyl-N,N-bis-(2-hydroxyethyl)-ammonio)-2-hydroxypropyl sulfate, 3-(N-coconutalkyl-N,N-bis-(2,3-dihydroxypropyl)-ammonio)-propanesulfonate, N-tetradecyl-N,N-dimethylammonioacetate, and N-hexadecyl-N,N-bis-(2,3-dihydroxypropyl)ammonioacetate. $C_{12}$–$C_{18}$ acylamidopropyl dimethylammonium betaines are preferably used.

The cationic surfactants optionally used contain at least one hydrophobic group and at least one basic water-solubilizing group optionally present as a salt. The hydrophobic group is an aliphatic or cycloaliphatic hydrocarbon group preferably containing 10 to 22 carbon atoms or an aromatic alkyl or cycloalkyl group preferably containing 8 to 16 carbon atoms. Suitable basic groups are primarily basic nitrogen atoms which may even be repeatedly present in a surfactant molecule. The compounds herein are preferably quaternary ammonium compounds such as, for example, N-dodecyl-N,N,N-trimethylammonium methosulfate, N-hexadecyl- or N-octadecyl-N,N,N-trimethylammonium chloride, N,N-di-coconutalkylN,N-dimethylammonium chloride, N-dodecyl-N,N-dimethyl-N-benzylammonium bromide, the reaction product of 1 mol tallowalkylamine with 10 mol of ethylene oxide, N-dodecyl-N-N'-trimethyl-1,3diaminopropane, and N-hexadecyl pyridinium chloride.

The nitrogen compounds mentioned above may be replaced by corresponding compounds containing a quaternary phosphorus atom or a tertiary sulfur atom.

Cleaning preparations containing cationic surfactants are generally used for disinfecting purposes.

The builders used include inorganic and organic compounds showing an overall alkaline reaction, more especially inorganic or organic complexing agents which are preferably present in the form of their alkali metal or amine salts, particularly the potassium salts. The builders also include alkali metal hydroxides, of which potassium hydroxide is preferably used.

Particularly suitable inorganic complexing builders are polyphosphates showing an alkaline reaction, particularly tripolyphosphates and pyrophosphates. They may be completely or partly replaced by organic complexing agents. Other inorganic builders suitable for use in accordance with the invention include, for example, bicarbonates, carbonates, borates, silicates or orthophosphates of the alkali metals.

Organic complexing agents of the aminopolycarboxylic acid type include inter alia nitrilotriacetic acid, ethylenediaminetetraacetic acid, N-hydroxyethyl ethylenediaminetriacetic acid and polyalkylene polyamine-N-polycarboxylic acids. Examples of di- and polyphosphonic acids include methylenediphosphonic acid, 1-hydroxyethane-1,1-diphosphonic acid, propane-1,2,3-triphosphonic acid, butane-1,2,3,4-tetraphosphonic acid, polyvinyl phosphonic acid, copolymers of vinyl phosphonic acid and acrylic acid, ethane-1,2-dicarboxy-1,2-diphosphonic acid, ethane-1,2-dicarboxy-1,2-dihydroxydiphosphonic acid, phosphonosuccinic acid, 1-aminoethane-1,1-diphosphonic acid, aminotri-(methylenephosphonic acid), methylamino- or ethylaminodi-(methylenephosphonic acid) and also ethylenediamine-tetra-(methylenephosphonic acid). Various, generally N- or P-free polycarboxylic acids have also been proposed as builders, the compounds in question often, although not always, being polymers containing carboxyl groups. A large number of these polycarboxylic acids show complexing power for calcium, including for example citric acid, tartaric acid, benzenehexacarboxylic acid, and tetrahydrofuran tetracarboxylic acid.

Since domestic cleaning preparations are generally almost neutral to mildly alkaline formulations, i.e. their undiluted concentrates or aqueous in-use solutions should generally have a pH value of from 7.0 to 10.5 and preferably from 7.5 to 9.5 for in-use concentrations of 2 to 20 and preferably 5 to 15 g/l water of aqueous solution, an addition of acidic alkaline component may be necessary for regulating the pH value.

Suitable acidic pH regulators include typical inorganic or organic acids or acidic salts, such as for example hydrochloric acid, sulfuric acid, bisulfates or alkalis, aminosulfonic acid, phosphoric acid or other acids of phosphorus, particularly the anhydrous acids of phosphorus and acidic salts thereof or acid-reacting solid compounds thereof with urea or other lower carboxylic acid amides, partial amides of phosphorus acids or anhydrous phosphoric acid, citric acid, tartaric acid, lactic acid and the like.

If the content of alkaline builders is not sufficient for regulating the pH value, alkaline organic or inorganic compounds, such as alkanolamines, namely mono-, di- or tri-ethanolamine or ammonia, may also be added.

It is also possible to incorporate solubilizers known per se, including not only water-soluble organic solvents such as, in particular, low molecular weight aliphatic alcohols containing 1 to 4 carbon atoms, but also the so-called hydrotropic substances of the lower alkylarylsulfonate type, for example toluene, xylene or cumenesulfonate. They may also be present in the form of their sodium, potassium or alkylamino salts. Other suitable solubilizers include water-soluble organic solvents, particularly those having boiling points above 75° C., such as for example the ethers of polyhydric alcohols of the same type or of different types or the partial ethers of polyhydric alcohols, including for example di- or triethylene glycol polyglycerols and the partial ethers of ethylene glycol, propylene glycol, butylene glycol or glycerol with aliphatic monohydric alcohols containing 1 to 4 carbon atoms in the molecule.

Other suitable water-soluble or water-emulsifiable organic solvents include ketones, such as acetone, methylethyl ketone, and also aliphatic, cycloaliphatic, aromatic and chlorinated hydrocarbons and terpene alcohols. In general, terpene alcohols also have an odor-forming effect.

Viscosity may be regulated by an addition of higher polyglycol ethers having molecular weights of up to about 600 or polyglycerol. Sodium chloride or urea are also suitable viscosity regulators.

In addition, the claimed preparations may contain additions of dyes and perfumes, preservatives and, if desired, antimicrobial agents of any kind.

Antimicrobial agents which may be used in accordance with the invention include, for example, compounds of the type which are stable and active in the liquid preparations according to the invention, for example of the quaternary ammonium compound type, such as benzylalkyldimethyl ammonium chloride.

Tests

The following tests were used to evaluate cleaning power:

(a) Plate Test:

The so-called plate test was carried out to determine the cleaning effect of the preparations used in accordance with the invention in manual dishwashing. The plate test is described in the journal "Fette, Seifen, Anstrichmittel", 74, (1972), pages 163 to 165.

Plates 14 cm in diameter were each soiled with 2 g of beef tallow (melting point 40 to 42° C., acid value 9 to 10), stored for 15 hours at 0° C. to +5° C. and rinsed with tapwater having a hardness of 16° Gh at 50° C. The test products were used in a dosage of 0.5 g/l of water, based on the preparation as a whole, or 0.15 g individual surfactant per liter of water. The number of plates that were washed clean with 5 liters of washing solution (plate count) is a measure of the cleaning effect.

(b) Testing of the cleaning effect (Gardner Test)

The cleaning preparation to be tested was applied to an artificially soiled plastic surface. A mixture of carbon black, machine oil, saturated fatty acid triglyceride and a low-boiling aliphatic hydrocarbon was used as the artificial soil. The 26×28 cm test surface was uniformly coated with 2 g of the artificial soil using a surface spreader and was then cut up into seven equally large pieces measuring 26×4 cm.

A plastic sponge was impregnated with 6 ml of the undiluted cleaning solution to be tested and moved by machine over the test surface. After 10 wiping movements, the cleaned test surface was held under running water and the loose soil removed. The cleaning effect, i.e. the whiteness of the plastic surface thus cleaned, was measured using a Dr. B. Lange LF 90 photoelectric colorimeter. The clean white plastic surface was used as the whiteness standard.

Since the colorimeter was set at 100% in the measurement of the clean surface and since the soiled surface produced a reading of 0, the values read off for the cleaned plastic surfaces could be equated with the percentage cleaning power (% CP). In the following tests, the percentage CP values indicated are the values determined by this method for the cleaning power of the tested cleaning preparations. They each represent averages of four measurements (cf. Quality Standards of the Industrieverband Putzund Pflegemittel e.V. (IPP), Frankfurt/Main (1982 Edition) in "Seifen, Fette, Öle, Wachse", 108, (1982).

The soil used to determine cleaning power consisted of:

| | % by weight |
|---|---|
| Gasoline 80/100 | — |
| White spirit K 30 | 44.8. |
| Spezialschwarz 4 | 4.8 |
| Coray 34 | — |
| Myritol 318 | 4.8 |
| Vaseline | 5.6 |

-continued

| | % by weight |
|---|---|
| Kaolin | 20.0 |
| Durcal 2 | 20.0 |

The composition of the cleaning preparations according to the invention is shown in the Tables, characterized comparison tests according to German application No. 26 16 404 being shown alongside. The balance to 100% by weight consists in each case of water.

The names of the constituents, mostly present as sodium salts, are explained in the following where they are not self-explanatory therefrom:

| | |
|---|---|
| ABS | $C_{12-14}$ alkyl benzenesulfonate |
| Texapon N ® | $C_{12-14}$ alkyl-$(EO)_2$-sulfate |
| Texapon LS ® | $C_{12-14}$ alkyl sulfate |
| α-Sulfosuccinate | α-sulfosuccinic acid dioctyl ester |
| Alkyl glucoside | $C_{12-14}$ fatty alcohol glucoside containing 1.4 glucose units |
| α-Sulfofatty acid ester | α-sulfo-$C_{12-16}$ fatty acid methyl ester |
| Dehypon LT 5 | $C_{12-14}$ fatty alcohol + 5 mol ethylene oxide |
| Dehypon LS 54 | $C_{12-14}$ fatty alcohol + 5 mol ethylene oxide + 4 mol propylene oxide |
| SAS | sec. $C_{13-15}$ alkanesulfonate |
| Amide soap | $C_{12-14}$ fatty acid cyanamide |
| Comperlan KD ® | $C_{12-14}$ fatty acid diethanolamide |
| Dodigen 1611 | $C_{12-14}$ alkyldimethylbenzyl ammonium chloride |
| Epicol G2G 10 | reaction product of 1 mol $C_{12-14}$ alkylepoxide with 1 mol ethylene glycol and 10 mol ethylene oxide |
| EDTA | ethylenediaminetetraacetic acid |
| EO | ethylene oxide |

Characteristic data of the cellulose ethers used in accordance with the invention (statistical mean values):

| Cellulose ether | Degree of substitution: Diethyl aminoethyl | Degree of substitution: Carboxy methyl | Viscosity of a 2% by weight solution (Brookfield) |
|---|---|---|---|
| Cellulose ether A | 0.44 | 0.71 | 12,000 mPa.s |
| Cellulose ether B | 0.42 | 0.43 | 34,000 mPa.s |
| Cellulose ether C | 0.28 | 0.61 | 9,000 mPa.s |

A catatonic cellulose ether derivative, namely Polymer JR 400® of Union Carbide (cf. U.S. Pat. No. 3,472,840) having an average molecular weight of 400,000 was used for a Comparison Example according to German Patent No. 26 16 404.

TABLE 1

| No. | ABS | Texapon N | α-sulfosuccinate | Alkyl glucoside | α-Sulfofatty acid ester | Dehypon LT 5 | SAS | Cumenesulfonate | Ethanol | Plate count | Without polymer Remarks | Plate count | With 1% polymer Remarks | Plate count | With 1% JR 400 ® according to DE 26 16 404 Remarks |
|---|---|---|---|---|---|---|---|---|---|---|---|---|---|---|---|
| | | | | | | | | | | number of plates washed (plate test) | | | | | |
| 1 | 17.5 | 7.5 | | | | | | 10 | | 15 | c, cl, lv | 24 | ac, sc, hv | 20 | cl, c, lv |
| 2 | 17.5 | 6.5 | | | | 1.5 | | 10 | | 15 | c, cl, mv | 24 | ac, c, hv sediment | 20 | cl, vfy, hv |
| 3 | | | 20 | 5 | | | | | 10 | 18 | fy, cl gel-like | 34 | vfy, c, gel-like | 22 | c, hv gel-like |
| 4 | | | | | 5 | | 20 | | 10 | 7 | vfy, lv | 12 | vfy, cl, hv | 6 | cl, mv, fy |

Abbreviations under remarks:
c = colorless,
ac = almost colorless,
lv = low viscosity,
hv = high viscosity,
cl = clear,
mv = medium viscosity,
fy = faint yellow,
vfy = very faint yellow,
sc = slightly clouded,
c = clouded As the results in Table 1 show, the ampholytic cellulose ethers according to the invention increase the performance of the dishwashing detergents to a greater extent than the cationic cellulose ethers according to German Patent No. 26 16 404.

Table 2 shows that the ampholytic cellulose ethers according to the invention, incorporated in small quantities in multipurpose and disinfecting cleaning preparations, produce distinct performance-enhancing effects.

Another surprising advantage of the ampholytic cellulose ethers is reflected in the removal of grease from resoiled plates which had previously been washed in polymer-containing wash solution. The following test illustrates this advantage:

The plates washed in the polymer-containing wash solution were resoiled as already described with 2 g of beef tallow/plate and stored for 15 hours at a temperature of 0 to 5° C. One plate was then placed horizontally in 5 liters of wash solution at 50° C. and the time required for complete removal of the grease from the surface of the plate without manual intervention was measured. In the case of plates which had been washed in a polymer-containing wash solution before resoiling with beef tallow, the cleaning time was approx. 2.5 minutes. In the case of plates which had been washed in a polymer-free wash solution before resoiling with beef tallow, it was not possible to obtain complete grease removal, even after considerably longer periods.

TABLE 2

Cleaning power as determined by the Gardner Test (pH 9)

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Texapon LS % by wt. | 6 | 6 | 6 | 6 | 6 | 6 | 6 | 6 | | | | | | |
| Comperlan KD % by wt. | 1 | 1 | 1 | 1 | 1 | 1 | 1 | 1 | | | | | | |
| Na gluconate % by wt. | 2 | 2 | 2 | 2 | | | | | 2 | 2 | 2 | 2 | | |
| ABA % by wt. | | | | | | | | | 8 | 8 | 8 | 8 | 8 | 8 |
| Epicol G2G10 % by wt. | | | | | | | | | 2 | 2 | 2 | 2 | 2 | 2 |
| Dehypon LS 54 % by wt. | | | | | | | | | | | | | | |
| EDTA % by wt. | | | | | | | | | | | | | | |
| Cellulose % by wt. ether A | | 0.2 | | | | 0.2 | | | | 0.2 | | | | 0.2 |
| Cellulose % by wt. ether B | | | 0.2 | | | | 0.2 | | | | 0.2 | | | |
| Cellulose % by wt. ether C | | | | 0.2 | | | | 0.2 | | | | 0.2 | | |
| Cleaning power | 13 | 39 | 34 | 41 | 11 | 28 | 18 | 26 | 32 | 69 | 63 | 64 | 12 | 37 |

| | Examples | | | | | | | | | |
|---|---|---|---|---|---|---|---|---|---|---|
| | 15 | 16 | 17 | 18 | 19 | 20 | 21 | 22 | 23 | 24 |
| Texapon LS % by wt. | | | | | | | | | | |
| Comperlan KD % by wt. | | | | | | | | | | |
| Na gluconate % by wt. | | | | | | | | | | |
| ABS % by wt. | 8 | 8 | | | | | | | | |
| Epicol G2G10 % by wt. | 2 | 2 | | | | | | | | |
| Dodigen 16 11 % by wt. | 2 | 2 | 2 | 2 | 2 | 2 | 2 | 2 | | |
| Dehypon LS 54 % by wt. | | | 5 | 5 | 5 | 5 | 5 | 5 | 5 | 5 |
| EDTA % by wt. | | | 2.4 | 2.4 | 2.4 | 2.4 | | | | |
| Cellulose % by wt. Ether A | | | | 0.2 | | | | 0.2 | | |
| Cellulose % by wt. ether B | 0.2 | | | | 0.2 | | | | 0.2 | |
| Cellulose % by wt. ether C | | 0.2 | | | | 0.2 | | | | 0.2 |
| Cleaning power | 30 | 49 | 26 | 66 | 32 | 55 | 19 | 21 | 23 | 24 |

Remarks: Cleaning power expressed in % CP, white clean film = 100% CP

What is claimed is:

1. A liquid composition for the cleaning of hard surfaces, said composition comprising an anionic surfactant either individually or in combination with a nonionic surfactant or amphoteric surfactant, and an ampholytic cellulose ether polymer, said ampholytic cellulose ether polymer comprising a diethylaminoethyl-carboxymethylcellulose having a degree of substitution of between about 0.4 and about 2.

2. A liquid composition as in claim 1 wherein the Brookfield viscosity of a 2% by weight aqueous solution of said cellulose ether polymer is between about 3,000 and about 120,000 mPa.s.

3. A liquid composition for the cleaning of hard surfaces, said composition comprising a nonionic surfactant either individually or in combination with a cationic surfactant, and an ampholytic cellulose ether polymer, said ampholytic cellulose ether polymer comprising a diethylaminoethyl-carboxymethylcellulose having a degree of substitution of between about 0.4 and about 2.

4. A liquid composition as in claim 3 wherein the Brookfield viscosity of a 2% by weight aqueous solution of said cellulose ether polymer is between about 3,000 and about 120,000 mPa.s.

5. A liquid composition for the cleaning of hard surfaces, said composition comprising:

(a) from about 1 to about 40% by weight of an anionic surfactant, (b) from 0 to about 20% by weight of a nonionic surfactant or amphoteric surfactant, (c) from 0 to about 10% by weight of a builder, (d) from 1 to about 15% by weight of a solubilizer, (e) from 0.01 to about 1.5% by weight of an ampholytic cellulose ether polymer, said ampholytic cellulose either polymer comprising a diethylaminoethyl-carboxymethlycellulose having a degree of substitution of between about 0.4 and about 2, and (f) the balance, water.

6. A liquid composition as in claim 5 wherein the Brookfield viscosity of a 2% by weight aqueous solution of said cellulose ether polymer is between about 3,000 and about 120,000 mPa.s.

7. A liquid composition as in claim 5 wherein said anionic surfactant is selected from a sulfonate, sulfate and carboxylate.

8. A liquid composition as in claim 5 wherein said builder is selected from an inorganic or organic complexing agent.

9. A liquid composition as in claim 5 wherein said builder is selected from a carbonate, bicarbonate, borate, silicate, phosphate and alkali metal hydroxide.

10. A liquid composition as in claim 5 having a pH value of from about 7.0 to about 10.5.

11. A liquid composition as in claim 5 wherein said solubilizer is selected from a low molecular weight aliphatic alcohol containing 1 to 4 carbon atoms, toluene, xylene, cumenesulfonate, and an ether of a polyhydric alcohol or lower alkyl glycol.

12. A liquid composition as in claim 5 including a viscosity regulator selected from a polyglycol ether having a molecular weight of up to about 600, polyglycerol, sodium chloride and urea.

* * * * *